United States Patent
Kusunoki

(10) Patent No.: US 9,871,565 B2
(45) Date of Patent: Jan. 16, 2018

(54) MIMO COMMUNICATION METHOD, TRANSMITTING DEVICE, AND RECEIVING DEVICE

(71) Applicant: Sony Corporation, Tokyo (JP)

(72) Inventor: Shigeo Kusunoki, Tokyo (JP)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 197 days.

(21) Appl. No.: 14/163,423

(22) Filed: Jan. 24, 2014

(65) Prior Publication Data

US 2014/0247812 A1 Sep. 4, 2014

Related U.S. Application Data

(60) Provisional application No. 61/771,470, filed on Mar. 1, 2013.

(51) Int. Cl.
*H04B 7/04* (2017.01)
*H04B 7/0452* (2017.01)
(Continued)

(52) U.S. Cl.
CPC ............ *H04B 7/0452* (2013.01); *H04J 13/18* (2013.01); *H04L 5/0021* (2013.01); *H04L 5/0026* (2013.01)

(58) Field of Classification Search
CPC .... H04B 7/0452; H04L 5/0021; H04L 5/0026
See application file for complete search history.

(56) References Cited

U.S. PATENT DOCUMENTS

2004/0190598 A1* 9/2004 Seki ................ H04L 5/026 375/141
2004/0252629 A1* 12/2004 Hasegawa ......... H04L 5/026 370/208
(Continued)

FOREIGN PATENT DOCUMENTS

CN 102291351 B * 9/2013
KR WO 2006088326 A2 * 8/2006 ........... H04B 7/2615
WO WO 2011/063052 A2 5/2011

OTHER PUBLICATIONS

Multicarrier CDMA with OFDM as Data Enhancement Technique and BER Analysis, P.R. Srilakshmiand B.A. Sapna. National Conference on Emerging Trends in VLSI, Embedded and Communication Systems-2013.*

(Continued)

*Primary Examiner* — Hassan Kizou
*Assistant Examiner* — Deepa Belur
(74) *Attorney, Agent, or Firm* — Oblon, McClelland, Maier & Neustadt, L.L.P.

(57) ABSTRACT

A Multiple Input Multiple Output (MIMO) communication method and system for performing communication between N (N is an integer greater than or equal to 2) transmitting devices each having a transmit antenna and at least one receiving device having N receive antennas by using a multi-user MIMO scheme. The method includes dividing the N transmitting devices into a plurality of sets, and assigning an orthogonal code to each set of transmitting devices as a digital signal sequence to be transmitted by each of the transmitting devices, and arranging the digital signal sequences to be transmitted by the transmitting devices in a frequency axis direction in which an inverse fast Fourier transform is performed, and performing coding.

15 Claims, 10 Drawing Sheets

(51) Int. Cl.
*H04J 13/18* (2011.01)
*H04L 5/00* (2006.01)

(56) References Cited

U.S. PATENT DOCUMENTS

| | | | | |
|---|---|---|---|---|
| 2004/0258027 | A1* | 12/2004 | Tsybakov | H04J 13/004 370/335 |
| 2005/0111348 | A1 | 5/2005 | Mottier et al. | |
| 2006/0035643 | A1* | 2/2006 | Vook | H04L 5/0094 455/450 |
| 2006/0071851 | A1* | 4/2006 | Graas | G01S 19/29 342/357.395 |
| 2006/0072499 | A1* | 4/2006 | Kent | H04B 7/0697 370/328 |
| 2006/0140291 | A1* | 6/2006 | Thomas, Jr. | H04L 27/265 375/260 |
| 2007/0195908 | A1* | 8/2007 | Attar | H04B 7/0452 375/267 |
| 2007/0202818 | A1* | 8/2007 | Okamoto | H04B 7/0697 455/101 |
| 2011/0075753 | A1 | 3/2011 | Jung et al. | |
| 2011/0280197 | A1 | 11/2011 | Brueck et al. | |
| 2012/0033630 | A1* | 2/2012 | Chung | H04B 7/0473 370/329 |
| 2012/0099636 | A1* | 4/2012 | Ki | H04B 1/7097 375/229 |
| 2013/0039332 | A1 | 2/2013 | Nazar et al. | |
| 2013/0077720 | A1* | 3/2013 | Wang | H04B 1/712 375/341 |
| 2013/0107791 | A1* | 5/2013 | Oh | H04B 7/0452 370/312 |
| 2014/0029659 | A1* | 1/2014 | Balraj | H04B 7/0452 375/229 |
| 2014/0269547 | A1* | 9/2014 | Valliappan | H04W 16/02 370/329 |
| 2014/0301329 | A1* | 10/2014 | Kim | H04L 1/1861 370/329 |
| 2015/0009921 | A1* | 1/2015 | Papadopoulos | H04L 5/0023 370/329 |

OTHER PUBLICATIONS

Extended European Search Report issued Jun. 11, 2014 in Patent Application No. 14157291.7.
Office Action dated Nov. 6, 2017, in corresponding European Patent Application No. 14 157 291.7.

* cited by examiner

FIG. 2

$$\begin{pmatrix} RxNB0 \\ RxNB1 \\ RxNB2 \\ RxNB3 \end{pmatrix} = \begin{pmatrix} h00 & h01 & h02 & h03 \\ h10 & h11 & h12 & h13 \\ h20 & h21 & h22 & h23 \\ h30 & h31 & h32 & h33 \end{pmatrix} \begin{pmatrix} TxUE0 \\ TxUE1 \\ TxUE2 \\ TxUE3 \end{pmatrix}$$

FIG. 7A $$\begin{pmatrix} Rx0(f) \\ Rx1(f) \\ Rx2(f) \\ Rx3(f) \end{pmatrix} = \begin{pmatrix} h00(f) & h01(f) & h02(f) & h03(f) \\ h10(f) & h11(f) & h12(f) & h13(f) \\ h20(f) & h21(f) & h22(f) & h23(f) \\ h30(f) & h31(f) & h32(f) & h33(f) \end{pmatrix} \cdot \begin{pmatrix} a(f) \\ b(f) \\ c(f) \\ d(f) \end{pmatrix}$$

FIG. 7B $$\begin{pmatrix} Rx0(f0) + Rx0(f1) \\ Rx1(f0) + Rx1(f1) \\ Rx2(f0) + Rx3(f1) \\ Rx3(f0) + Rx3(f1) \\ \hline Rx0(f0) - Rx0(f1) \\ Rx1(f0) - Rx1(f1) \\ Rx2(f0) - Rx3(f1) \\ Rx3(f0) - Rx3(f1) \end{pmatrix} = \begin{pmatrix} h00(f0) + h00(f1) & h10(f0) + h10(f1) & 0 & 0 \\ h01(f0) + h01(f1) & h01(f0) + h01(f1) & 0 & 0 \\ h02(f0) + h02(f1) & h02(f0) + h02(f1) & 0 & 0 \\ h03(f0) + h03(f1) & h03(f0) + h03(f1) & 0 & 0 \\ \hline 0 & 0 & h20(f0) + h20(f1) & h30(f0) + h30(f1) \\ 0 & 0 & h21(f0) + h21(f1) & h31(f0) + h31(f1) \\ 0 & 0 & h22(f0) + h22(f1) & h32(f0) + h32(f1) \\ 0 & 0 & h33(f0) + h33(f1) & h33(f0) + h33(f1) \end{pmatrix} \cdot \begin{pmatrix} a(f0) \\ b(f0) \\ c(f0) \\ d(f0) \end{pmatrix}$$

$a(f0) = a(f1),$
$b(f0) = b(f1),$ etc.

INNER PRODUCT WITH W2_0
INNER PRODUCT WITH W2_1

FIG. 7C $$\begin{pmatrix} Rx0(f0) + Rx0(f1) \\ Rx0(f0) - Rx0(f1) \\ Rx1(f0) + Rx1(f1) \\ Rx1(f0) - Rx1(f1) \end{pmatrix} = \begin{pmatrix} h00(f0) + h00(f1) & h10(f0) + h10(f1) & 0 & 0 \\ h01(f0) - h01(f1) & h01(f0) - h01(f1) & 0 & 0 \\ 0 & 0 & h20(f0) + h20(f1) & h30(f0) + h30(f1) \\ 0 & 0 & h21(f0) - h21(f1) & h31(f0) - h31(f1) \end{pmatrix} \cdot \begin{pmatrix} a(f0) \\ b(f0) \\ c(f0) \\ d(f0) \end{pmatrix}$$

MIMO COMMUNICATION METHOD, TRANSMITTING DEVICE, AND RECEIVING DEVICE

CROSS REFERENCE TO RELATED APPLICATIONS

This application is related to and claims priority under 35 U.S.C. §119(e) to Provisional Application Ser. No. 61/771,470, filed Mar. 1, 2013, the contents of which are hereby incorporated herein by reference.

BACKGROUND

1. Field

The present disclosure relates to a MIMO (multi-user MIMO: hereinafter referred to as "MU-MIMO") communication method that uses MIMO (multiple-input and multiple-output communication), and to a transmitting device and a receiving device.

2. Description of the Related Art

There have been an increasing number of situations where mobile communication terminals and many other kinds of devices perform communication via radio networks. This is expected to be more noticeable in a situation where LTE (Long Term Evolution), which is a communication standard that has started to be put into practical use, and its extended versions, or LTE-Advance and LTE-Evolution, are put in practical use. This situation is a worldwide trend, and analysis performed by 3GPP (3rd Generation Partnership Project) predicts a case where, for example, the number of smartphones will sharply increase, resulting in congestion of radio traffic. In particular, for communication terminals such as smartphones, there is predicted a case where communication between many devices is out of human control and congestion of radio traffic occurs.

As one of the countermeasures against the above-described situations, LTE currently adopts a modulation scheme based on OFDM (Orthogonal Frequency Division Multiplexing) to achieve an increase in communication capacity. That is, in LTE, currently, a multi-carrier technology is used to increase frequency utilization efficiency. In addition, a system with a maximum bandwidth of 100 MHz will be proposed in future release of the LTE standard.

However, serious congestion of traffic is expected in the near future even with the use of such a method. That is, analysis performed by 3GPP predicts that such congestion might not be sufficiently accommodated by a conventional method in which the communication speed is increased and the number of frequency bands used is increased to increase communication channel capacity.

As one of the countermeasures against this, MU-MIMO (multi-user MIMO) has been proposed. MU-MIMO is a communication scheme defined in Transmission Mode 5 in 3GPP standardization of Rel.8. For example, for uplink communication from a plurality of (N) terminals in a single cell to a base station by applying MU-MIMO to LTE, the base station prepares N receive antennas. The individual terminals perform communication of completely different contents during the same time period and at the same frequency, and the base station receives the contents using the N receive antennas. The base station utilizes orthogonality (correlation) between channels to identify the terminals from which signals have been received.

There also has been studied an extended version in which MIMO of a plurality of terminals and a base station controller (BSC) that collectively manages a plurality of cells is constructed in units of BSCs.

By applying MU-MIMO, there is a beneficial effect of potentially increasing the utilization efficiency of frequency resources and increasing the communication channel capacity, and MU-MIMO is being studied as a technology to address a future increase in communication traffic to some extent.

In MIMO, channels are expressed in terms of a matrix based on a combination of antennas on the transmitter side and antennas on the receiver side. For example, in 3GPP, a configuration with up to 16 transmit antennas and 16 receive antennas is proposed. In this case, a 16×16 matrix (hereinafter referred to as an "H-matrix") is obtained. That is, the base station needs to separate and receive communication from up to 16 terminals using the inverse matrix of the H-matrix. Because of the difficulty of a technique for accurately separating signals of 16 channels using the inverse matrix of such a 16×16 H-matrix, actually, no more than 4×4 or 8×8 MIMO will possibly be put into practical use. Such MU-MIMO is being prepared for practical use by communication providers through experiments in their research institutions.

MU-MIMO requires the inverse matrix of the H-matrix to be determined on the receiver side (base station side). Generally, the elements of the H-matrix (that is, instantaneous transfer functions for a channel) are determined on the terminal side using a reference signal or pilot signal (RS) transmitted from the base station, and the terminal feeds back the results to the base station. The base station constructs an H-matrix by using all the results, and determines the inverse matrix thereof. After communication is started, at reception, signals from all the terminals are received and then the receive signals from the respective terminals are separated using the inverse matrix. For utilization of the inverse matrix, zero forcing, the MMSE method, or the like is used.

Meanwhile, some terminals move at high speed. In addition, in a case where a terminal is used in an adverse environment such as a metropolitan area, the instantaneous transfer functions for a channel may constantly vary largely due to large amounts of fading and shadowing. Therefore, there is a need to update the H-matrix at certain short time intervals. That is, the base station needs to continue to frequently compute and update the inverse matrix. The computation of an inverse matrix requires a greater number of computation processes as the order of the matrix increases.

In the case of an Nth order square matrix, computation needs to be performed ($N^3 \times N!$) times to determine the inverse matrix, and LU decomposition or the like is usually used for the fourth or higher orders, while high-speed computation requires time and a large amount of power consumption. Additionally, the inverse matrix does not always exist. That is, it does not exist in a case where the H-matrix is not regular. The higher the order, the more the possibility of the inverse matrix not being determined. If it is not possible to determine the inverse matrix, the orthogonality of channels collapses, resulting in MIMO not being established.

Accordingly, the work of determining the inverse matrix imposes a significantly large load on an MU-MIMO base station, leading to a delay of the processing time and an increase in power consumption. Furthermore, because MIMO is not established, there is a problem in that the problem of traffic congestion is not substantially resolved.

Furthermore, to increase reception quality through diversity at the base station, the number of receive antennas or receiving units required is doubled, and MU-MIMO becomes more difficult to implement as the order of MU-MIMO increases.

The inventor has recognized the difficulty in implementing MU-MIMO.

BRIEF SUMMARY

A MIMO communication method according to the present disclosure is configured to perform communication between N (N is an integer greater than or equal to 2) transmitting devices each having a transmit antenna and at least one receiving device having N receive antennas by using a MU-MIMO scheme.

The N transmitting devices is divided into a plurality of sets. An orthogonal code is assigned to each set of transmitting devices as a digital signal sequence to be transmitted by each of the transmitting devices. The digital signal sequences to be transmitted by the transmitting devices are arranged in a frequency axis direction in which an inverse fast Fourier transform is performed, and coding is performed.

A transmitting device according to the present disclosure is used for a MU-MIMO scheme in which N (N is an integer greater than or equal to 2) transmitting devices divided into a plurality of sets are used and perform wireless communication with at least one receiving device having N receive antennas.

The transmitting device includes a data generation unit, an inverse fast Fourier transform unit, a radio frequency unit, and a transmit antenna.

The data generation unit generates a digital signal sequence to be transmitted, using an orthogonal code assigned to each of the sets.

The inverse fast Fourier transform unit assigns the orthogonal code obtained by the data generation unit to each frequency on a frequency axis, performs an inverse fast Fourier transform, and generates an OFDM signal.

The radio frequency unit transmits, as a radio frequency signal, from the transmit antenna the OFDM signal obtained by the inverse fast Fourier transform unit through the transform.

A receiving device according to the present disclosure is used for a MU-MIMO scheme in which at least one receiving device having N receive antennas receives signals transmitted from N (N is an integer greater than or equal to 2) transmitting devices divided into a plurality of sets.

The signals received by the receive antenna include a signal obtained by performing an inverse fast Fourier transform on a digital signal sequence using an orthogonal code assigned to transmitting devices in each of the plurality of sets into which the N transmitting devices are divided.

According to the present disclosure, transmitting devices are separated into several groups by using orthogonal codes. Code multiplexing and orthogonalization of a channel matrix enables a receiving device to perform reception with a small number of antennas. This can simply the channel matrix, and therefore prevent the production of a non-regular matrix achieve a reduction in computation load. Since the number of antennas can be reduced, application of diversity can be facilitated.

BRIEF DESCRIPTION OF THE DRAWINGS

FIG. 2 is a diagram illustrating a channel matrix according to the example of the embodiment of the present disclosure.

FIGS. 7A, 7B, and 7C include diagrams illustrating an H-matrix according to example of the embodiment of the present disclosure.

DETAILED DESCRIPTION

Figures 9A, 9B:
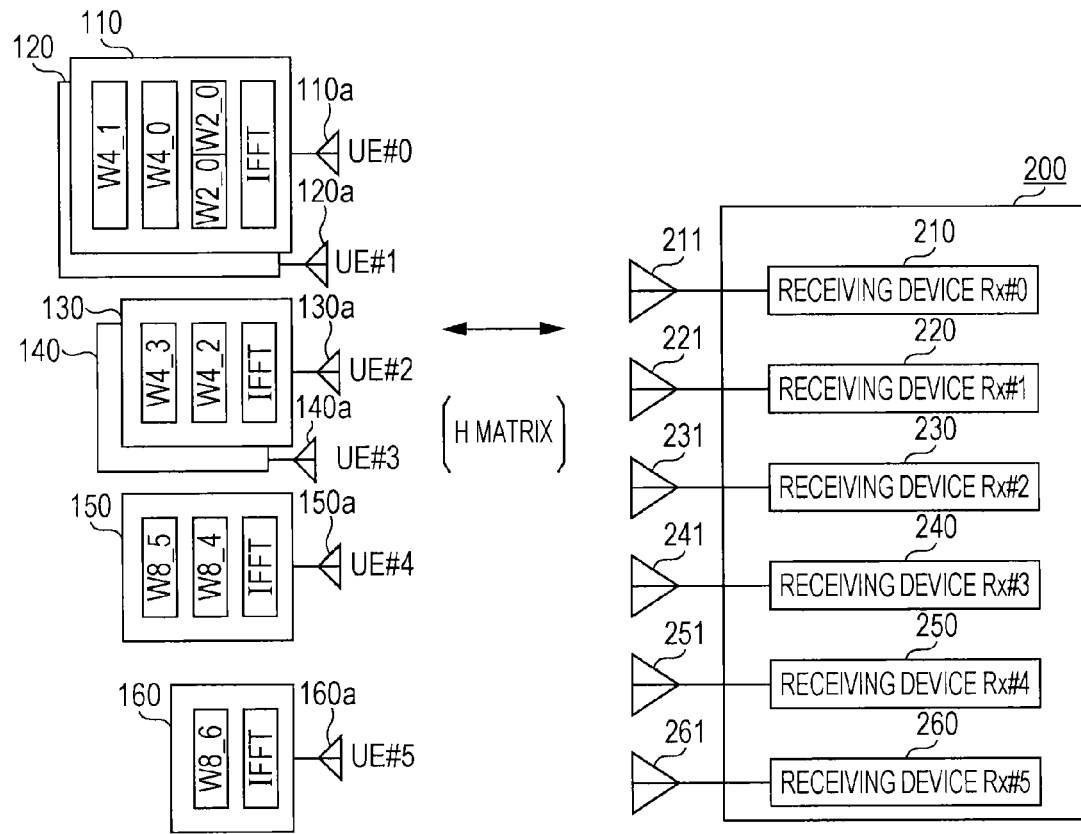
FIGS. 9A and 9B include diagrams illustrating an example of grouping in MU-MIMO according to an example of another embodiment of the present disclosure.
Figure 10:
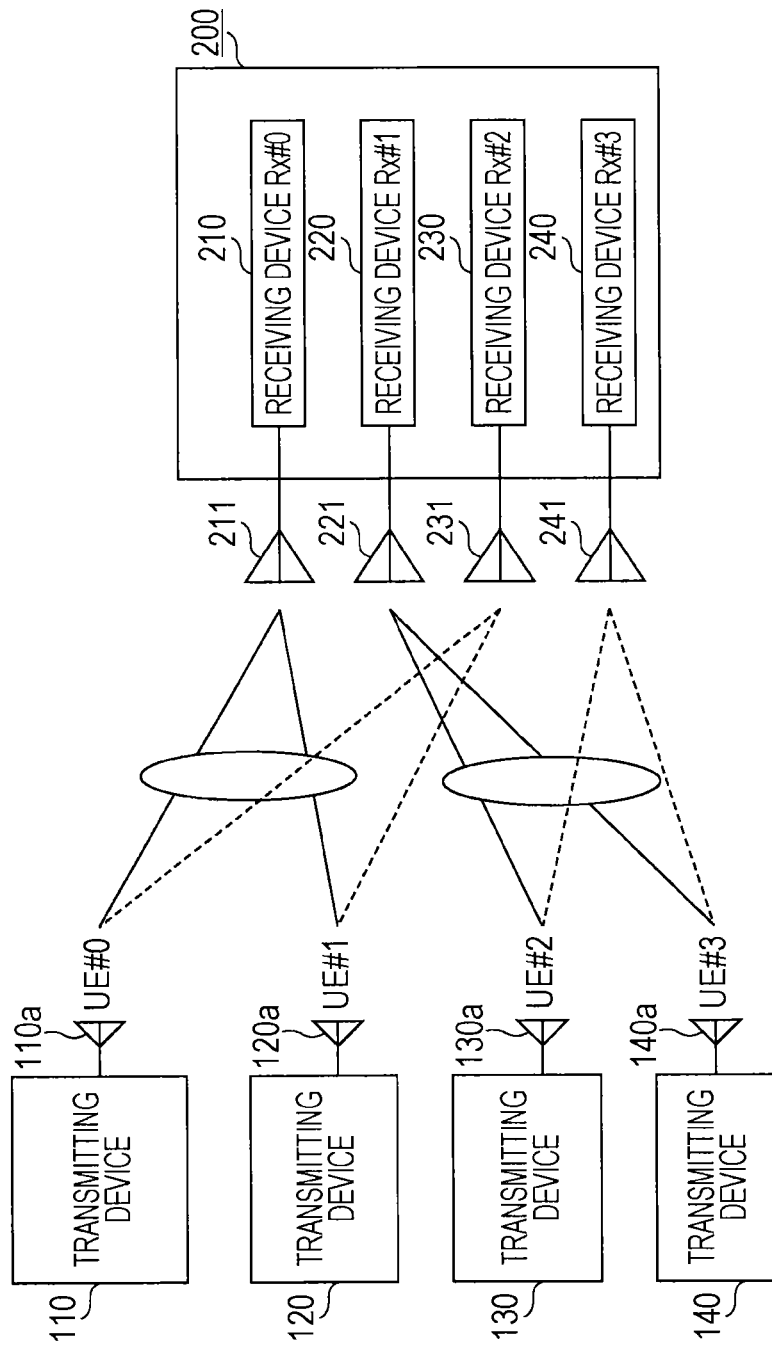
FIG. 10 is a diagram of an example of using diversity according to the example of the other embodiment of the present disclosure.

Examples of embodiments of the present disclosure will be described hereinafter with reference to the accompanying drawings in order below.
1. Example of entire communication system according to embodiment (FIG. 1, FIG. 2)
2. Example of configuration of transmitting device according to embodiment (FIG. 3)
3. Example of data arrangement (FIG. 4, FIG. 5)
4. Example of configuration of receiving device according to embodiment (FIG. 6)
5. Example of receiving operation
6. Example of H-matrix (FIGS. 7A, 7B, and 7C)
7. Example of data separation processing (FIG. 8)
8. Example of Other Embodiment (other example of grouping in MU-MIMO: FIGS. 9A and 9B)
9. Example of other embodiment (example of implementing diversity: FIG. 10)
10. Other modified examples

[1. Example of Entire Communication System According to Embodiment]

Figure 1:
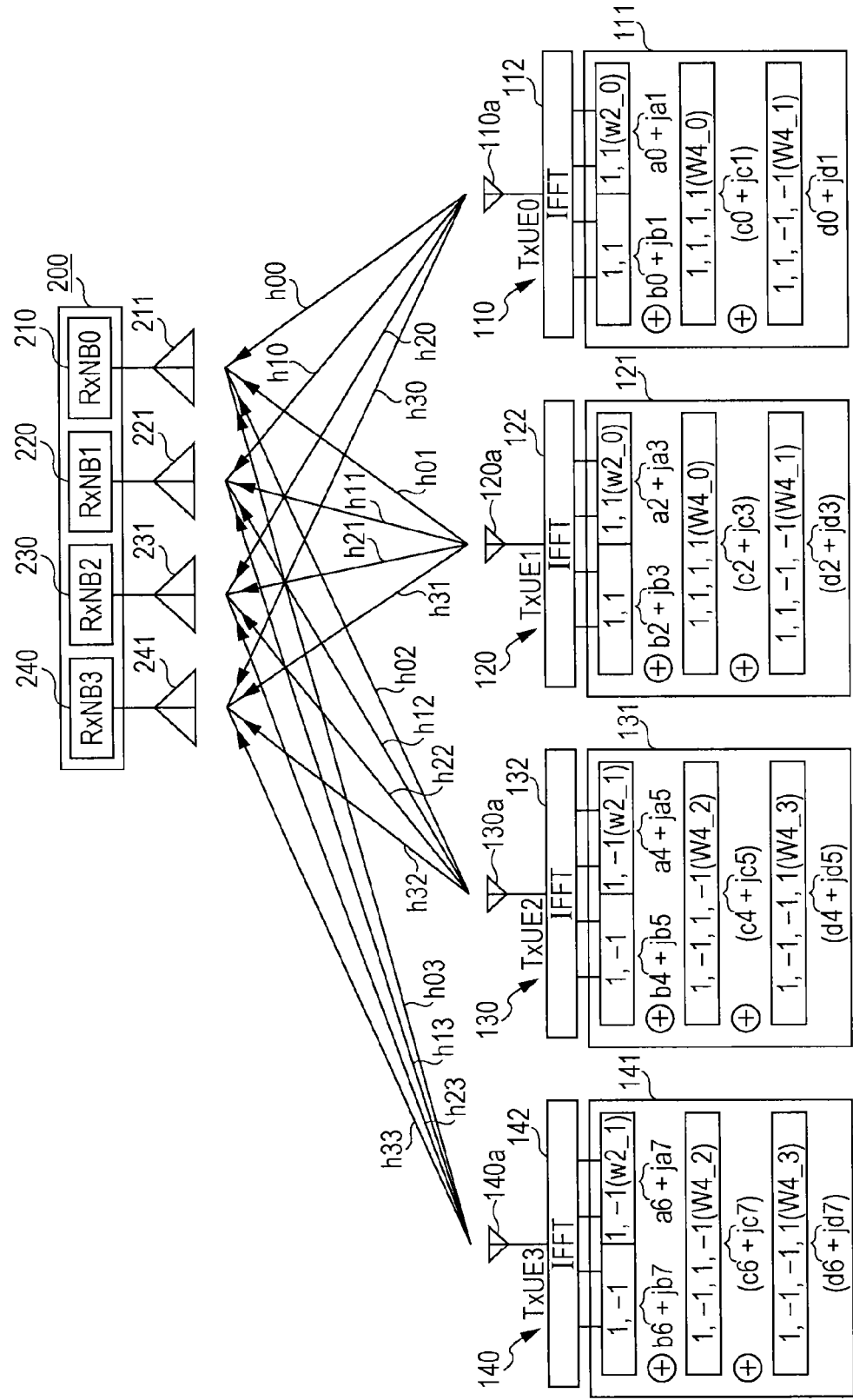
FIG. 1 is a diagram illustrating an example configuration of a communication system according to an example of an embodiment of the present disclosure.

FIG. 1 is a diagram illustrating an example configuration of an entire communication system according to an embodiment of the present disclosure.

An example of this embodiment provides a wireless communication system including a base station and terminals, which uses a communication standard referred to as LTE. Each of the terminals performs wireless communication with a neighboring base station capable of performing wireless communication in accordance with the position of the terminal. In the communication system illustrated in FIG. 1, the configuration of uplinks from the terminals to the base station is illustrated, whereas the illustration of the configuration of downlinks from the base station to the terminals is omitted.

In the example in FIG. 1, transmitting devices 110, 120, 130, and 140 included in the respective terminals, and receiving devices 210, 220, 230, and 240 included in a base station 200 are illustrated. In the example in FIG. 1, the four transmitting devices 110 to 140 include transmit antennas 110a, 120a, 130a, and 140a, respectively, and the receiving devices 210 to 240 include receive antennas 211, 221, 231, and 241, respectively. The four transmit antennas 110a to 140a and the four receive antennas 201 to 204 are used to perform wireless communication using the MIMO scheme. Here, the transmit antennas 110a to 140a are antennas included in the respective terminals, and are based on the MU-MIMO scheme through which the base station 200 simultaneously communicates with multiple users (multi-user). In the example disclosed herein, the transmitting devices 110 to 140 use the same frequency band for wireless communication.

The four transmitting devices 110 to 140 form pairs of two devices (the pair of transmitting devices 110 and 120 and the pair of transmitting devices 130 and 140). Each pair is assigned an orthogonal code that is spread so that the orthogonal codes have a pair-wise orthogonal relationship. The orthogonal codes used here are, for example, OVSF (Orthogonal Variable Spreading Factor) codes, which are codes used in the UTRA (Universal Mobile Telecommunications System) standard. Further, each of data multiplexing units 111, 121, 131, and 141 adds a second-order OVSF code and fourth-order OVSF codes to generate a transmit data sequence. A specific example of adding signals using the data multiplexing units 111 to 141, which are data generation units, will be described below.

In the transmitting devices 110 to 140, as illustrated in FIG. 1, the transmit data sequences obtained by the data multiplexing units 111, 121, 131, and 141 are subjected to an inverse fast Fourier transform by inverse fast Fourier transform units 112, 122, 132, and 142. Multi-carrier signals modulated using the OFDM scheme are generated through the inverse fast Fourier transform, and the transmit antennas 110a to 140a wirelessly transmit the multi-carrier signals. A specific detailed configuration of the transmitting devices 110 to 140 illustrated in FIG. 1 will be described below.

The signals transmitted by the transmit antennas 110a to 140a of the four transmitting devices 110 to 140 are received by the receive antennas 211 to 241 connected to the four receiving devices 210 to 240 in the base station 200.

Here, the four transmitting devices 110 to 140 are represented by TxUE0, TxUE1, TxUE2, and TxUE3, and the four receiving devices 210 to 240 are represented by RxNB0, RxNB1, RxNB2, and RxNB3. In this case, the signals transmitted and received between the four transmitting devices 110 to 140 and the four receiving devices 210 to 240 are represented by a matrix illustrated in FIG. 2. In the matrix in FIG. 2, h00 to h33 are transfer functions between the antennas illustrated in FIG. 1. That is, as illustrated in FIG. 1, 4×4, or 16, transmission paths are present between the four transmit antennas 110a to 140a and the four receive antennas 201 to 204, and the transfer functions h00 to h33 exist for the respective transmission paths.

In general, each transfer function is estimated on the receiver side, and is fed back to the transmitter side. That is, for example, a predetermined reference signal (for example, in LTE, Zadoff-Chu code) is placed at non-overlapping positions in time and frequency domains modulated by OFDM, and is transmitted. On the receiver side, the time and frequency domains are learned, channels are estimated using the reference signal, and estimation results are sent to the transmitter side. On the transmitter side, the transfer functions sent from all the receiving devices are collected to obtain the matrix illustrated in FIG. 2.

[2. Example of Configuration of Transmitting Device According to Embodiment]

Figure 3:
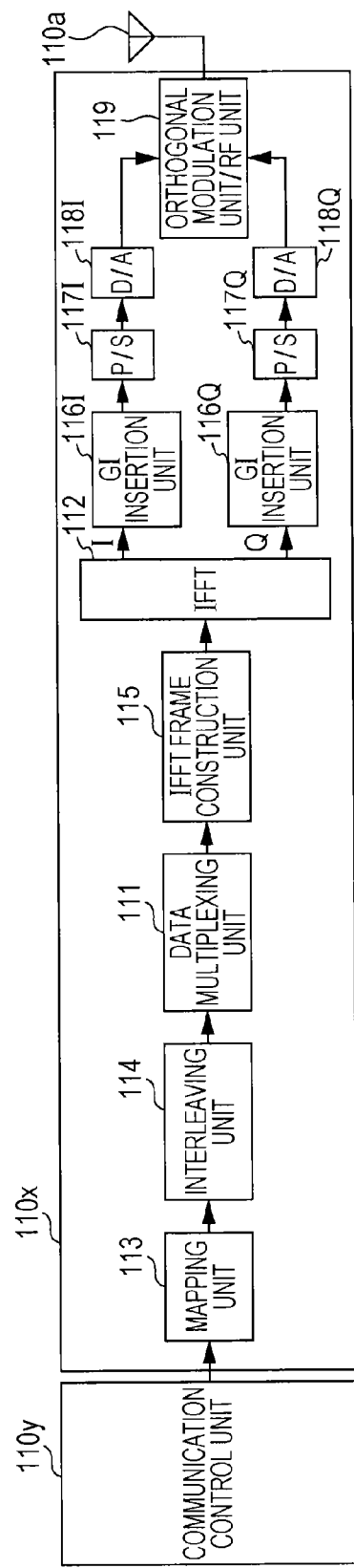
FIG. 3 is a block diagram illustrating a transmitting device according to the example of the embodiment of the present disclosure.

FIG. 3 is a diagram illustrating the configuration of the transmitting device 110. The other transmitting devices 120, 130, and 140 also have the same configuration.

In the transmitting device 110, a communication control unit 110Y controls transmission processing which is performed in a transmitting unit 110X.

In the transmitting unit 110X, a data stream sent from the communication control unit 110Y is supplied to a mapping unit 113. The mapping unit 113 performs mapping of the data stream. The data output from the mapping unit 113 is supplied to an interleaving unit 114. The interleaving unit 114 performs interleaving processing to distribute data in accordance with a certain rule.

The data subjected to the processing by the interleaving unit 114 is supplied to the data multiplexing unit 111, and multiplexing processing is performed. The details of the multiplexing processing will be described below. The data multiplexed by the data multiplexing unit 111 is formed in an IFFT frame construction unit 115 to create data having a frame configuration to be subjected to an inverse fast Fourier transform (IFFT).

The data having the frame configuration obtained by the IFFT frame construction unit 115 is supplied to the inverse fast Fourier transform unit 112. The inverse fast Fourier transform unit 112 performs OFDM modulation to convert from the frequency axis to the time axis, and obtains transmit data of the I-component (real-part component) and the Q-component (imaginary-part component). The transmit data of the I-component and the transmit data of the Q-component are supplied to guard interval insertion units 116I and 116Q, respectively, to insert guard intervals. The transmit data output from the guard interval insertion units 116I and 116Q are supplied to parallel/serial conversion units 117I and 117Q, and are converted into serial data. The serial data of the I-component and the Q-component obtained by the parallel/serial conversion units 117I and 117Q through conversion are supplied to digital/analog converters 118I and 118Q, and are converted into analog signals. The signals of the I-component and the Q-component obtained by the digital/analog converters 118I and 118Q through conversion are supplied to an orthogonal modulation unit and radio frequency unit 119, and are subjected to orthogonal modulation with the I-component and the Q-component and to frequency conversion into a certain transmit frequency. The transmit signal output from the orthogonal modulation unit and radio frequency unit 119 is supplied to the transmit antenna 110a, and is wirelessly transmitted from the transmit antenna 110a.

Note that the transmit frequencies for wireless transmission from the transmit antennas 110a to 140a of the transmitting devices 110 to 140 are the same.

[3. Example of Data Arrangement]

Figure 4:
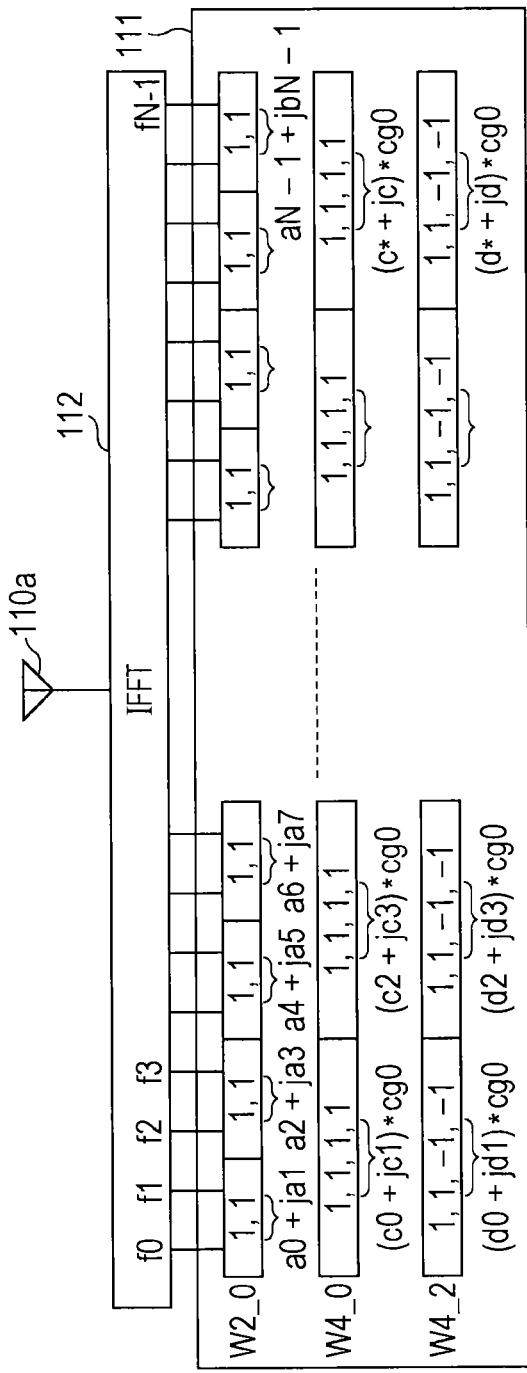
FIG. 4 is a diagram illustrating data arrangement in the transmitting device according to the example of the embodiment of the present disclosure.

FIG. 4 illustrates processing performed by the data multiplexing unit 111 of the transmitting device 110. As already described above, a transmitting device spreads data of a transmit signal with an orthogonal signal. Here, for example, as illustrated in FIG. 1, when four transmitting devices 110 to 140 are used, the transmitting devices 110 to 140 are divided into two pairs of two devices. For example, the pair of transmitting devices 110 and 120 and the pair of transmitting devices 130 and 140 are obtained.

Then, each pair is assigned an orthogonal code that is spread so that the orthogonal codes have a pair-wise orthogonal relationship. The orthogonal codes used herein are, for example, OVSF codes. Further, each of the data multiplexing units 111, 121, 131, and 141 adds a second-order OVSF code and fourth-order OVSF code to generate a transmit data sequence.

What is drawing attention to the multiplexing of the second-order codes and the fourth-order codes is that since all the signals are added on the receiver side, codes that are not orthogonal to each other may also be added together. In this case, an inner product of 0 may be produced depending on the data pattern to be multiplexed when data is demodulated by despreading, and separation is not possible. To avoid this, preprocessing for increasing the amplitude of data is performed on the transmitter side. Note that the transmitting devices do not necessarily perform communication at the maximum speed. The layer for code multiplexing may be changed, if necessary. In the case of less than or equal to one half the maximum speed, only the SF2 codes are used. Conversely, in order to increase the communication speed, higher-order (such as eighth-order) OVSF codes are multiplexed.

Figure 5:
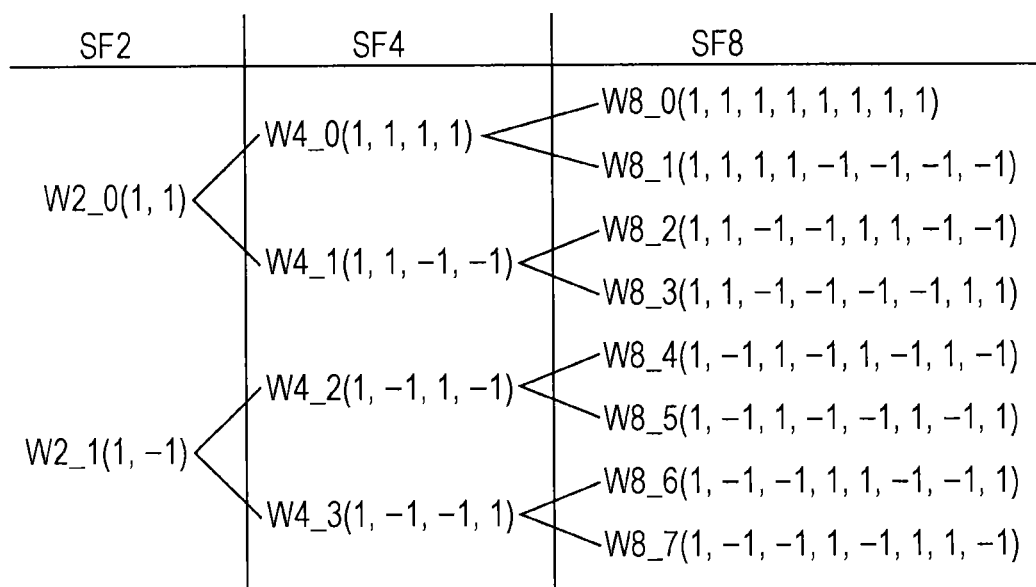
FIG. 5 is a diagram illustrating an example of OVSF codes.

FIG. 5 is a diagram illustrating the configuration of OVSF codes.

For example, in the case of 4×4 MIMO, SF2 codes and SF4 codes are multiplexed using second-order and fourth-order OVSF codes, that is, all the SF2 codes and the SF4 codes illustrated in FIG. 5. Multiplexing is performed in order to compensate for a reduction in communication speed, where the communication speed is effectively reduced by spreading. In FIG. 5, the second-order (SF2), fourth-order (SF4), and eighth-order (SF8) OVSF codes are illustrated.

For example, the data multiplexing units 111 and 121 in one pair of transmitting devices 110 and 120 illustrated in FIG. 1 use one code W2_0 (1, 1) among the SF2 codes illustrated in FIG. 5 as the second-order (SF2) OVSF code. The data multiplexing units 111 and 121 further use two codes W4_0 (1, 1, 1, 1) and W4_1 (1, 1, −1, −1) among the four SF4 codes illustrated in FIG. 5 as the fourth-order (SF4) OVSF codes. Note that data in the inverse fast Fourier transform unit 112 to 142 of the transmitting devices 110 to 140 illustrated in FIG. 1 is not illustrated to avoid redundancy.

Further, the data multiplexing units 131 and 141 of the other pair of transmitting devices 130 and 140 illustrated in FIG. 1 use the other code W2_1 (1, −1) among the SF2 codes illustrated in FIG. 5 as the second-order (SF2) OVSF code. The data multiplexing units 131 and 141 further use two codes W4_2 (1, −1, 1, −1) and W4_3 (1, −1, −1, 1) among the four SF4 codes illustrated in FIG. 5 as the fourth-order (SF4) OVSF codes.

Division by a second-order OVSF code (SF2) will now be described. Here, sub-carriers are modulated using QPSK (Quadrature Phase Shift Keying).

The two orthogonal codes SF2 are given by the following Expression (1) and Expression (2).

$$W2\_0 = (1, 1) \quad \text{Expression (1)}$$

$$W2\_1 = (1, -1) \quad \text{Expression (2)}$$

Here, as illustrated in FIG. 1, the transmitting device 110 of UE0 and the transmitting device 120 of UE1, which are the same pair of transmitting devices, have the same data structure. Further, the transmitting device 130 of UE3 and the transmitting device 140 of UE4 have the same data structure.

First, the data configuration of the pair of transmitting device 110 of UE0 and transmitting device 120 of UE1 will be described.

A transmit data stream obtained at an input unit of the inverse fast Fourier transform unit 112 of the transmitting device 110 is alternately distributed into the real part (I-part) and the imaginary part (Q-part). The data obtained at the input unit of the inverse fast Fourier transform unit 112 is data set to the frequency axis for the inverse fast Fourier transform.

Then, each of the I-part side and Q-part side is multiplied by the orthogonal code W2_0 given by Expression (1) above.

The respective streams can be represented by the following Expressions (3) and (4):

$$I=(a0,a2,a4,\,,\,) \quad \text{Expression (3)}$$

$$Q=(a1,a3,a5,\,,\,), \quad \text{Expression (4)},$$

where a0, a1, etc., represent 1, −1, etc.

As a result of the data streams in Expressions (3) and (4) being spread by the orthogonal code given by Expression (1), data given by the following Expression (5) is obtained.

$$(a0+j\cdot a1, a0+j\cdot a1, a2+j\cdot a3, a2+j\cdot a3,\,,\,) \quad \text{Expression (5)}$$

The data given by Expression (5) is set to the frequency axis on which the inverse fast Fourier transform unit 112 performs a transform. Here, j is the imaginary unit.

For the transmitting device 120 of UE1, the data streams given by Expressions (3) and (4) become data streams given by the following Expressions (6) and (7).

$$I=(b0,b2,b4,\,,\,) \quad \text{Expression (6)}$$

$$Q=(b1,b3,b5,\,,\,) \quad \text{Expression (7)}$$

The data stream set to the frequency axis of the inverse fast Fourier transform unit 122 of the transmitting device 120 is given by Expression (8) below:

$$(b0+j\cdot b1, b0+j\cdot b1, b2+j\cdot b3, b2+j\cdot b3,\,,\,). \quad \text{Expression (8)}$$

The same applies to the transmitting device 130 of UE2 and the transmitting device 140 of UE3, which are the other pair of transmitting devices. That is, as a result of having been spread by the orthogonal code given by Expression (2), the data to be set to the frequency axis of the inverse fast Fourier transform units 132 and 142 is given by Expressions (9) and (10).

$$(c0+j\cdot c1, -c0-j\cdot c1, c2+j\cdot c3, -c2-j\cdot c3,\,,\,) \quad \text{Expression (9)}$$

$$(d0+j\cdot d1, -d0-j\cdot d1, d2+j\cdot d3, -d2-j\cdot d3,\,,\,) \quad \text{Expression (10)}$$

In Expressions (9) and (10), the signals represented by c* and d* (* denotes the value in the expression) are data streams set in the transmitting device 130 of UE2 and the transmitting device 140 of UE3.

In the example disclosed herein, fourth-order (SF4) OVSF codes are further multiplexed. The reason is that the communication speed is made to match that when no spreading is used. That is, as a result of spreading with a second-order (SF2) OVSF code, the number of pieces of data to be arranged during the inverse fast Fourier transform is one half that when no spreading is used. Accordingly, the communication speed is halved. To compensate for the halved communication speed, further multiplexing of codes is performed to restore the communication speed.

In the case of this multiplexing, since the second-order OVSF codes having a length of 2 are exhaustively used, as illustrated in FIG. 1, fourth-order (SF4) codes having a length of 4 are used. This allows a 4-bit OVSF code to be assigned per data bit, resulting in the communication speed being reduced to one quarter. Thus, two SF4 codes are used to restore the communication speed to one half. Multiplexing the SF4 codes and the SF2 code, described previously, can restore the communication speed to 1, thereby preventing a reduction in speed due to spreading.

The OVSF codes are assigned using the orthogonality of codes having different lengths, which is a feature. Hence, as illustrated in FIG. 1, the codes W4_0 and W4_1 are assigned to the pair of transmitting devices 110 and 120 that use the code W2_0, and the codes W4_2 and W4_3 are assigned to the pair of transmitting devices 130 and 140 that use the code W2_1. The details of the codes W4_0, W4_1, W4_2, and W4_3 are given below. The codes below are the same as those illustrated in FIG. 5.

| W4_0 (1, 1, 1, 1)   |
| W4_1 (1, 1, −1, −1) |
| W4_2 (1, −1, 1, −1) |
| W4_3 (1, −1, −1, 1) |

As described above, all the SF2 and SF4 codes are used, and are added on the receiver side. Therefore, there is a pattern in which data is not successfully demodulated even by despreading (inner product) in normal demodulation processing. To avoid this, when spreading with the fourth-order (SF4) code W4_* is performed, a coefficient cg0 whose amplitude is increased after spreading is multiplied during transmission (W4_* is one of W4_0, W4_1, W4_2, and W4_3). The coefficient cg0 is set to a value greater than or equal to 1.0. For example, the coefficient cg0 is set to 1.3. Multiplication of this coefficient on the transmitter side enables complete demodulation on the receiver side.

FIG. 4 illustrates a state where the code W4_* is multiplied by the coefficient cg0. That is, the SF4 codes W4_0, W4_1, W4_2, and W4_3, all of which are multiplied by the coefficient cg0 by the data multiplexing unit 111, are multiplexed. The data multiplied by the coefficient cg0 is supplied to the inverse fast Fourier transform unit 112.

[4. Example of Configuration of Receiving Device According to Embodiment]

Figure 6:
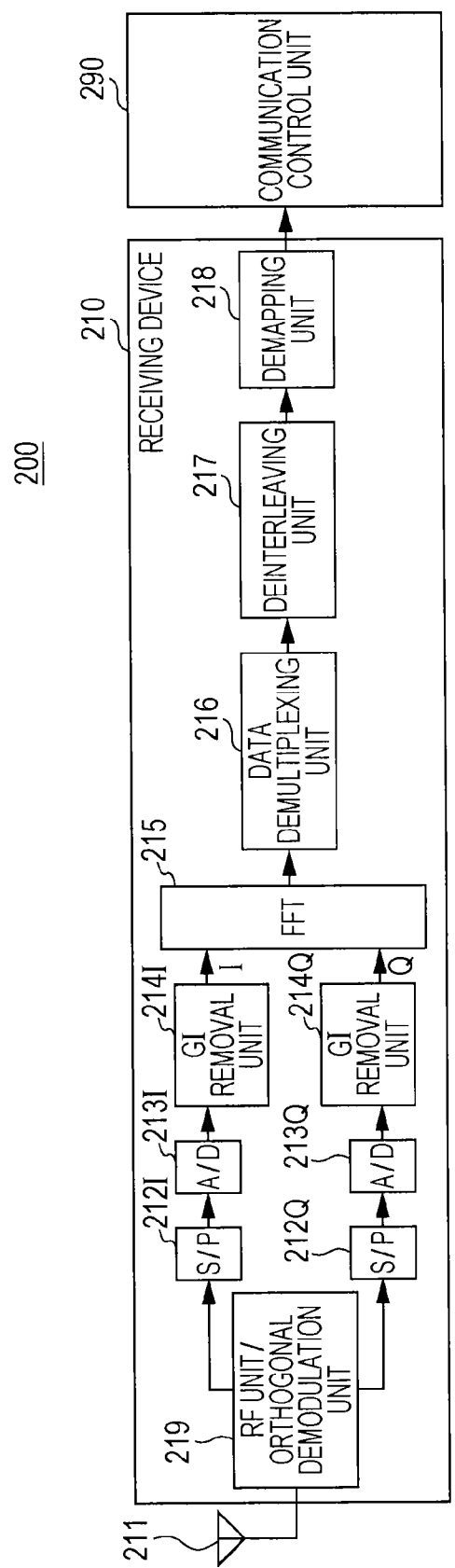
FIG. 6 is a block diagram illustrating a receiving device according to the example of the embodiment of the present disclosure.

FIG. 6 is a block diagram illustrating an example configuration of the four receiving devices 210, 220, 230, and 240 included in the base station 200 according to the embodiment. While FIG. 6 illustrates the configuration of the receiving device 210, the other receiving devices 220 to 240 also have the same configuration.

A signal received by the receive antenna 211 is supplied to a radio frequency unit and orthogonal modulation unit 219, where a signal wirelessly transmitted at a certain frequency is demodulated and receive data of the I-component and the Q-component are obtained. The receive data of the I-component and the receive data of the Q-component are supplied to serial/parallel conversion units 212I and 212Q, respectively, and are converted into parallel data. The receive data of the I-component and the Q-component obtained by the serial/parallel conversion units 212I and 212Q through conversion are supplied to analog/digital converters 213I and 213Q, and are converted into digital data.

The receive data obtained by the analog/digital converters 213I and 213Q through conversion are supplied to guard interval removal units 214I and 214Q, and the guard intervals (GIs) are removed. The receive data of the I-component and the Q-component, from which the guard intervals have been removed, are supplied to a fast Fourier transform unit (FFT unit) 215, and conversion processing for converting the time axis and the frequency axis is performed for demodulation from OFDM modulation.

The data obtained by the fast Fourier transform unit 215 through transformation is supplied to a data separation unit 216, and separation processing is performed on the receive data. The separated receive data is supplied to a deinterleaving unit 217. The deinterleaving unit 217 restores data distributed by the interleaving unit in the transmission processing. The receive data restored by the deinterleaving unit 217 is supplied to a demapping unit 218, and is demapped. The receive data demapped by the demapping unit 218 is supplied to a communication control unit 290.

[5. Example of Receiving Operation]

Next, the receiving operation of the receiving device will be described.

The receiving device 210 obtains a receive signal in the form of the matrix illustrated in FIG. 2.

The matrix illustrated in FIG. 2 represents that obtained after the transform performed by the fast Fourier transform unit 215 of the receiving device 210. That is, the matrix is expressed as frequency range subjected to fast Fourier transform. Here, the elements of the H-matrix are exactly different depending on frequency. The elements that are different depending on frequency are expressed as $h00(f)$ and so forth for the respective transfer functions illustrated in FIG. 2, and data is represented by a, b, c, and d.

In this case, the components of frequencies f0 and f1 of the signal to be output from the fast Fourier transform unit 215 included in the receiving device 210 connected to the receive antenna 211 of the receiving device 210 illustrated in FIG. 1 are given by the following Expressions (11) and (12):

$$Rx(f0)=h00(f0)*a*(1)+h10(f0)*b*(1)+h20(f0)*c*(1)+h40(f0)*d*(-1) \quad \text{Expression (11)}$$

$$Rx(f1)=h00(f1)*a*(1)+h10(f1)*b*(1)+h20(f1)*c*(1)+h40(f1)*d*(-1) \quad \text{Expression (12)}$$

In Expressions (11) and (12), (1) and (−1) represent the elements of the codes W2_0 and W2_1 given by Expressions (1) and (2). The data a is transmitted from the transmit antenna 110a, and the data b is transmitted from the transmit antenna 120a, where the f0 and f1 components have been multiplied by the first element (1) of the code W2_0 and the second element (1) of the code W2_0, respectively. Similarly, the data c is transmitted from the transmit antenna 130a, and the data d is transmitted from the transmit antenna 140a, where the f0 and f1 components have been multiplied by the first element (1) of the code W2_1 and the second element (−1) of the code W2_1, respectively.

The receiving device 210 despreads the receive signals by the codes W2_0 and W2_1. The despreading is based on the following expressions.

$$Rx0(f0) + Rx0(f1) = [Rx(f0), \quad \text{Expression (13)}$$
$$Rx(f1)] * (1, 1)T = [h00(f0) + h00(f1)] *$$
$$a + [h10(f0) + h10(f1)] * b +$$
$$[h20(f0) - h20(f1)] * c + [h30(f0) - h30(f1)] * d$$

$$Rx0(f0) - Rx0(f1) = [Rx(f0), \quad \text{Expression (14)}$$
$$Rx(f1)] * (1, -1)T = [h00(f0) - h00(f1)] *$$
$$a + [h10(f0) - h10(f1)] * b +$$
$$[h20(f0) + h20(f1)] * c + [h30(f0) + h30(f1)] * d$$

In Expressions (13) and (14), "T" represents transposing. Further, the complex data represented by Expressions (5), (8), (9), and (10) is represented by "a", "b", "c", and "d".

Rx0, Rx1, Rx2, and Rx3 represent receive signals of the receiving devices 210, 220, 230, and 240, respectively.

The third term and the fourth term of Expression (13) and the first term and the second term of Expression (14) are equal to substantially zero. This is based on the difference between adjacent frequencies of channels. For example, the LTE standard generally adopts 15 kHz spacing, and each channel has a bandwidth of 1.5 MHz at minimum. Therefore, the difference is usually as small as to be negligible. Accordingly, only the signal from the transmitting device 110 and the signal from the transmitting device 120 remain in Expression (13). Further, only the signal from the transmitting device 130 and the signal from the transmitting device 140 remain in Expression (14).

The correct cancellation of the difference of channels in terms of frequency is enabled by using the signal $h^{}(f)$ of the corresponding channel and multiplying data by the corresponding signal $1/h^{}(f)$ (here, $h^{}$ is one of the transfer functions h00 to h33 illustrated in FIG. 1 and FIG. 2**).

This cancellation processing may be either processing performed when a transmitting device performs transmission or processing performed on a signal received by a receiving device. Since h00 ($f$) generally represents a value much smaller than 1, multiplication during transmission may increase transmission power. Thus, preferably, the processing is performed on the receiver side.

In actuality, since noise is added, the difference in terms of frequency is buried in the noise, and correction for the difference may not necessarily be carried out.

For the codes SF4, since the code W2_0 is orthogonal to the codes W4_2 and W4_3, the fourth-order (SF4) codes from the transmitting device 130 and the transmitting device 140 produce zero in an inner product with the code W2_0 in Expression (13). Similarly, since the code W2_1 is orthogonal to the codes W4_0 and W4_1, the fourth-order (SF4) codes from the transmitting device 110 and the transmitting device 120 produce zero in an inner product with the code W2_1 in Expression (14).

Accordingly, it is only required to calculate inner products with the code W2_0 and the code W2_1 to separate the signals for the pair of transmitting devices 110 and 120 and the signals for the pair of transmitting devices 130 and 140.

For the zero produced in the inner products with the fourth-order codes SF4, as in the case of the second-order codes SF2, a difference of channels based on different frequencies occurs. However, such a difference is also negligible because, for example, the LTE standard provides a frequency width up to 60 kHz. The difference of channels in terms of frequency can be corrected for, if necessary, using a method similar to that for the second-order codes SF2.

[6. Example of H-Matrix]

Simplification of the H-matrix illustrated in FIG. 2 through the processes described above will be described with reference to FIGS. 7A, 7B, and 7C.

An H-matrix illustrated in FIG. 7A is obtained when the processes of this embodiment are not performed, and is a 4×4 matrix. The matrix is present for each of the frequencies at which the inverse fast Fourier transform and the fast Fourier transform are applied. In actuality, the same matrix is repeatedly used if a difference of channels in terms of frequency is small. In FIGS. 7A, 7B, and 7C this is represented as a function of "f". As transmit data from transmitting devices, the transmit data from the four transmitting devices 110 and 120, 130, and 140 are represented by a, b, c, and d, respectively. This is also set to the frequency axis for the inverse fast Fourier transform, and is a function of frequency.

In a case where the processes according to this embodiment are performed, data arrangement is different from that given in the example illustrated in FIG. 7A, and the same data is arranged in adjacent frequency axes such as the frequency axes f0 and f1 and the frequency axes f2 and f3. Accordingly, a(f0)=a(f1) and so forth. In FIGS. 7A, 7B, and 7C, this state is represented as a(f0).

The receiving device performs the inner products described above, so that the matrix illustrated in FIG. 7A is represented as illustrated in FIG. 7B. The upper half of the matrix in FIG. 7B represents the inner product with the code W2_0, and the lower half of the matrix in FIG. 7B represents the inner product with the code W2_1.

Rearranging the matrix illustrated in FIG. 7B in terms of the receive antennas 201, 202, 203, and 204 yields a matrix illustrated in FIG. 7C. In the matrix illustrated in FIG. 7C, the terms of Rx2 and Rx3 in the matrix illustrated in FIG. 7B are absent. This means that only Rx0 and Rx1 are used for reception. As a result, the computation of the 4×4 H-matrix is the computation of a block-diagonalized 4×4 matrix, making a significantly simple inverse matrix computation feasible.

That is, the inverse matrix of the diagonal block of that in FIG. 7C is determined, and is multiplied by results obtained by dispreading by the codes W2_0 and W2_1 (the left side in FIG. 7C). Thus, transmit signals a, b, c, and d can be determined.

[7. Example of Data Separation Processing]

The pieces of data a, b, c, and d extracted through the processes described above have codes SF4 superimposed thereon.

Figure 8:
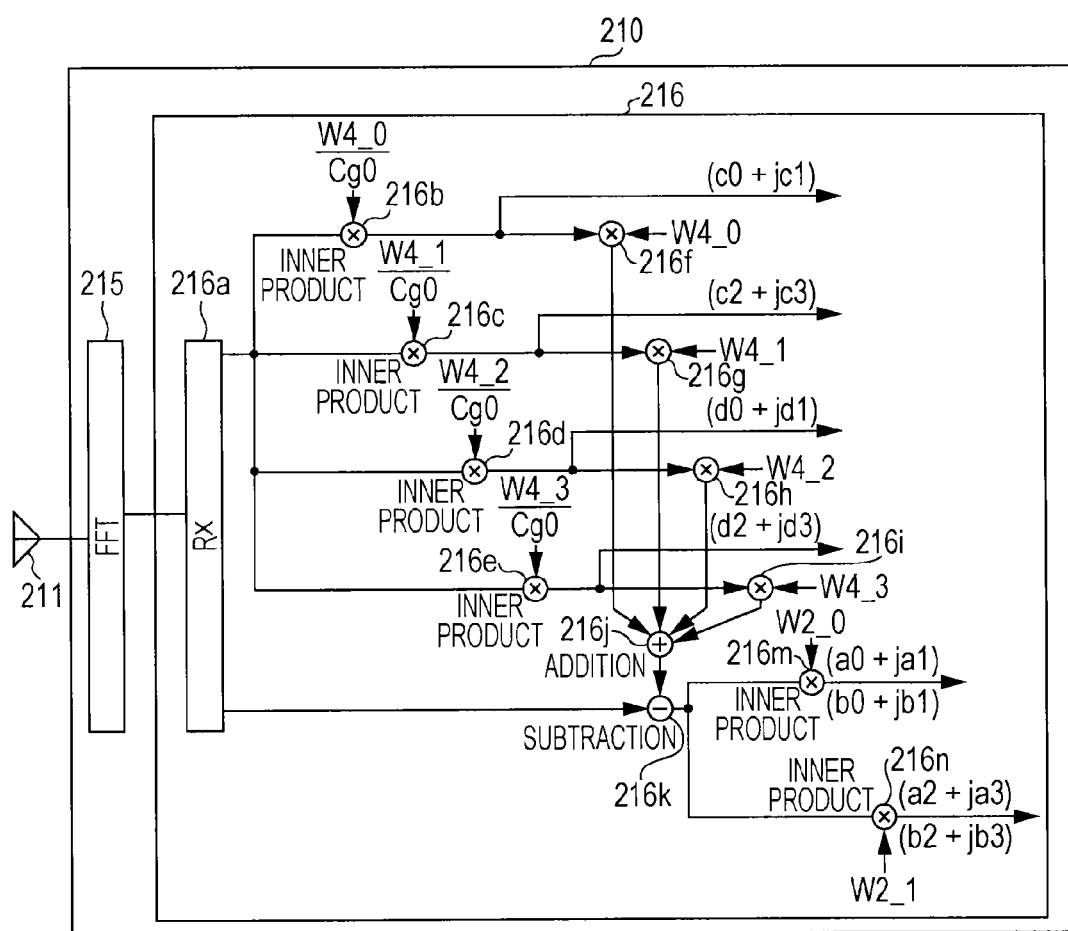
FIG. 8 is a diagram illustrating an example of a data separation unit in the receiving device.

FIG. 8 is a diagram illustrating processing for separating the data of a code SF2 and the data of a code SF4 from a signal transformed and output by the fast Fourier transform unit 215.

In order to separate an added signal, first, in the first step, an inner product is computed by multiplication of the higher-order code SF4. That is, a multiplier 216*b* multiplies a receive data string 216*a* by the code W4_0, which is a fourth-order code. Further, a multiplier 216*c* multiplies the receive data string 216*a* by the code W4_1. Further, a multiplier 216*d* multiplies the receive data string 216*a* by the code W4_2. Further, a multiplier 216*e* multiplies the receive data string 216*a* by the code W4_3. During each multiplication, a coefficient Cg0 is multiplied.

Through the processes described above, the four codes 4_0, 4_1, 4_2, and 4_3, which are orthogonal to each other, have mutual inner products of zero, and therefore transmit signals (c0, c1, c2, c3, d0, d1, d2, d3) can be obtained. Some of them might not be decoded because of the interference of the second-order codes. This can be avoided by multiplication of the fourth-order codes by the coefficient Cg0.

In the second step, multipliers 216*f*, 216*g*, 216*h*, and 216*i* further again multiply the codes W4_0, W4_1, W4_2, and W4_3 using the obtained data relating to the fourth-order codes in a manner similar to that for transmission. The results are added by an adder 216*j*, and the added signal is subtracted from the receive signal by a subtractor 216*k*. As can be seen from Expression (9), this operation corresponds to an operation of subtracting the terms relating to the fourth-order codes from the receive signal, and, as a result, only the terms relating to the second-order codes remain.

In the third step, the inner products of the results obtained in the manner described above and the codes W2_0 and W2_1 are calculated by multipliers 216*m* and 216*n*. Therefore, all the receive streams (a0, a1, a2, a3, b0, b1, b2, b3) can be separated and decoded.

In a case where multi-level modulation such as 16QAM is used as a modulation scheme, decoding is not easily carried out because information has already been carried on the amplitude by multiplication of the coefficient cg0. Hence, codes having different lengths are further multiplexed in order to increase transmission efficiency. When the orthogonal codes having different lengths are to be multiplexed, a coefficient for increasing the amplitude is multiplied.

[8. Example of Other Embodiment (Other Example of Grouping in MU-MIMO)]

In the foregoing description, an example of application to 4×4 MU-MIMO communication as illustrated in FIG. 1 has been described. N, which is the number of transmitting devices or receiving devices, can be expanded to a general integer. For example, in 16×16 MU-MIMO communication, which are currently being studied, any grouping may be performed such as eight devices and eight devices, four sets of four devices, and six devices and ten devices. This can reduce the orders of channel matrices, thus facilitating derivation of the inverse matrices and facilitating avoidance from becoming non-regular.

FIG. 9A illustrates an example in which six transmitting devices 110 to 160 that are separate terminals are arranged and the base station 200 includes six receiving devices 210 to 260. Since six transmitting devices and six receiving devices are provided, 6×6 MU-MIMO communication is implemented. FIG. 9A illustrates an example of grouping in a case where 6×6 MU-MIMO communication is performed.

The transmitting devices 110 to 160 include transmit antennas 110*a* to 160*a*, respectively. Also, the receiving devices 210 to 260 include receive antennas 211 to 261, respectively.

In the system configuration in FIG. 9A, the six transmitting devices 110 to 160 are divided into the following four sets:
First set: the transmitting devices 110 and 120
Second set: the transmitting devices 130 and 140
Third set: the transmitting device 150
Fourth set: the transmitting device 160

FIG. 9B illustrates an example of assigning OVSF codes to the respective sets when grouping is applied in the illustrated manner. In FIG. 9B, UE0, UE1, UE2, UE3, UE4, and UE5 represent the transmitting devices 110, 120, 130, 140, 150, and 160, respectively, and Rx0, Rx1, Rx2, Rx3, Rx4, and Rx5 represent the receiving devices 210, 220, 230, 240, 250, and 260, respectively.

As given by the matrix in FIG. 9B, OVSF codes are assigned to the respective sets.

For example, if the transmitting devices 110 and 120 in the first set are terminals that perform high-speed communication, a code W2_0 as the second-order code SF2 and fourth-order codes W4_0 and W4_1 are assigned to the transmitting devices 110 and 120 so that high-speed communication can be performed.

Further, if the transmitting devices 130 and 140 in the second set are terminals that perform middle-speed communication, fourth-order codes W4_2 and W4_3 are assigned to the transmitting devices 130 and 140. Further, if the transmitting devices 150 and 160 in the third set and the fourth set are terminals that perform low-speed communication, codes W8_4, 5, and 6 are assigned as codes that are less than or equal to an eighth-order code SF8 and that are orthogonal to each other.

With the assignment described above, the channel matrix can be block-diagonalized in the manner illustrated in FIG. 9B.

In the example in FIGS. 9A and 9B, block diagonalization is performed with the numbers of transmit antennas and receive antenna being the same. In contrast, the combination of receive antennas may be changed. In this case, the positions of the sets other than zero in the block-diagonalized matrix in FIG. 9B are changed. In either case, applying the processes according to this embodiment described above facilitates separation of a receive signal.

It is also possible to determine the assignment of OVSF codes on the receiving device side, or on the base station 200 side. The base station 200 determines a communication speed required for each terminal on the basis of communication quality information included in a call setup request from the terminal, or a transmitting device, determines the order of code to be multiplexed, and informs each transmitting device of it. The processing for performing code assignment on the base station side is not limited to the case of grouping as illustrated in FIGS. 9A and 9B.

[9. Example of Other Embodiment (Example of Implementing Diversity)]

Next, an example of diversity reception as a modified example of this embodiment is illustrated in FIG. 10.

FIG. 10 illustrates an example of 4×4 MU-MIMO communication with four antennas on the transmitter side and four antennas on the receiver side.

In this case, applying the processes according to this embodiment described in the foregoing allows the base station 200 to receive signals from four transmitting devices 110 to 140 using only two receiving devices #0 210 and #1 220.

Therefore, two receiving devices #2 230 and #3 240 are used to perform the same reception processing as that of the two receiving devices #0 210 and #1 220, thereby allowing diversity reception with two systems, that is, the system of receiving devices 210 and 220 and the system of receiving devices 230 and 240.

The receive signals on the two systems are combined using, for example, RAKE combining, which is a technology known in the art as a process for diversity reception. Thus, the reception S/N can be improved. Alternatively, the receive signals may be combined by using maximum-ratio combining before being demodulated by fast Fourier transform.

As described above, according to the examples of the embodiments of the present disclosure, transmitting devices that are separate terminals are grouped into several sets using orthogonal codes, and code multiplexing and orthogonalization of a channel matrix are utilized to enable reception with a small number of antennas on the base station side. This can simplify the channel matrix, and therefore prevent the H-matrix from being non-regular. In addition, a reduction in computation load can be achieved. Furthermore, since the number of antennas and the number of receiving devices can be reduced, an overwhelming beneficial effect of facilitating diversity reception with a reduced number of antennas and receiving devices can be expected.

[10. Other Modified Examples]

Note that the configurations and processes recited in the claims of the present disclosure are not limited to those in the examples of the embodiments described above. It is to be understood that it is obvious to a person skilled in the art that a variety of modifications, combinations, and variations of the illustrated exemplary embodiments as come within the scope of the claims or equivalents thereof are possible depending on design or other elements.

For example, the illustrated examples of the embodiments provides an application to wireless communication of uplinks between terminals and a base station, which applies the communication standard referred to as LTE. The configurations or processes according to the present disclosure may also be applied to wireless communication of other similar uplinks.

REFERENCE SIGNS LIST 110, 120, 130, and 140, 150, 160: transmitting device (terminal), 101: communication control unit, 110a, 120a, 130a, 140a, 150a, 160a: transmit antenna, 110X: transmitting unit, 110Y: communication control unit, 111, 121, 131, and 141: data multiplexing unit, 112, 122, 132, 142: inverse fast Fourier transform unit (IFFT unit), 113: mapping unit, 114: interleaving unit, 115: IFFT frame construction unit, 116I, 116Q: guard interval insertion unit, 117I, 117Q: parallel/serial conversion unit, 118I, 118Q: digital/analog converter, 119: orthogonal modulation unit and radio frequency unit, 200: base station, 201: receive antenna, 210, 220, 230, and 240, 250, 260: receiving device, 211: radio frequency unit and orthogonal modulation unit, 212I, 212Q: serial/parallel conversion unit, 213I, 213Q: analog/digital converter, 214I, 214Q: guard interval removal unit, 215: fast Fourier transform unit (FFT unit), 216: data separation unit, 217: deinterleaving unit, 218: demapping unit, 290: communication control unit.

What is claimed is:

1. A Multiple Input Multiple Output (MIMO) communication method for performing communication between N (N is an integer greater than or equal to 2) mobile communication devices each having a transmit antenna and at least one base station device having N receive antennas by using a multi-user MIMO scheme, the MIMO communication method comprising:

dividing the N mobile communication devices into a plurality of sets, at least one of the sets including at least two mobile communication devices, and assigning a plurality of OVSF codes, from among a plurality of orthogonal OVSF codes that are spread to have an orthogonal relationship, to each set of mobile communication devices as a digital signal sequence to be transmitted by each of the mobile communication devices, wherein the plurality of OVSF codes assigned to each set of mobile communications includes at least a first order OVSF code and a pair of second order OVSF codes which share the single first order OVSF code as a root; and arranging the digital signal sequences to be transmitted by the mobile communication devices in a frequency domain in which an inverse fast Fourier transform is performed, and performing coding, wherein each of an in-phase and quadrature portion of a transmit data stream is multiplied by the assigned codes at each mobile communication device prior to each mobile communication device performing the inverse fast Fourier transform, wherein the first order OVSF code and the pair of second order OVSF codes are multiplied with different portions of the transmit data stream in a multiplexed manner.

2. The MIMO communication method according to claim 1, further comprising:

repeating, for an entire transmission range, a process for assigning one OVSF code having a length of 2 to the power of n per signal bit to each of frequencies, the number of which is equal to 2 to the power of n (n is an integer), on a frequency axis on which an inverse fast Fourier transform is performed.

3. The MIMO communication method according to claim 2, further comprising:

as coding in a first stage for the digital signal sequences, performing coding with an OVSF code having a length 2 to the power of n, as coding in a second stage, assigning an OVSF code having a length of 2 to the power of (n+1) per signal bit to frequencies, the number of which is equal to 2 to the power of (n+1), on the frequency axis on which an inverse fast Fourier transform is performed, and an amplitude thereof is multiplied by a coefficient greater than 1, and adding signals coded in the second stage to signals coded in the first stage.

4. The MIMO communication method according to claim 3, further comprising:

as a coding in a stage higher than the second stage, assigning one OVSF code having a length of 2 to the power of (n+2) per signal bit to frequencies, the number of which is equal to 2 to the power of (n+1), on the frequency axis on which an inverse fast Fourier transform is performed, and an amplitude thereof is multiplied by a coefficient greater than 1, and adding signals coded in the respective stages.

5. The MIMO communication method according to claim 1, further comprising:

individually assigning the N mobile communication devices an OVSF code sequence to be used, and adaptively setting communication speeds of the respective mobile communication devices.

6. The MIMO communication method according to claim 3, wherein the at least one base station device including the N receive antennas includes N receiving units to which the respective receive antennas are connected, and each receiving unit:

despreads a received signal with an OVSF code of (2 to the power of n) to separate a signal spread by an OVSF code having a length of (2 to the power of n), despreads the separated signal with an OVSF code of (2 to the power of (n+1)) to extract a signal spread by an OVSF code having a length of 2 to the power of (n+1), subtracts a signal obtained by multiplying the extraction result by a signal of a corresponding channel from the result obtained by separation, and despreads the subtraction result using the OVSF code having a length of (2 to power of n), thereby extracting a spread signal.

7. The MIMO communication method according to claim 1, wherein the base station device performs reception using receive antennas, the number of which is larger than the number of mobile communication devices in the plurality of sets, and using receiving units connected to the receive antennas, and combines receive signals obtained by the respective receiving units by using maximum-ratio combining.

8. A mobile communication device used for a multi-user MIMO scheme in which N (N is an integer greater than or equal to 2) mobile communication devices divided into a plurality of sets are used, at least one of the sets including at least two mobile communication devices, and perform wireless communication with at least one base station device having N receive antennas, the mobile communication device comprising:
  circuitry configured to
    generate a digital signal sequence to be transmitted, using a plurality of OVSF codes, from among a plurality of orthogonal OVSF codes that are spread to have an orthogonal relationship, assigned to each of the sets, wherein the plurality of OVSF codes assigned to each set of mobile communications includes at least a first order OVSF code and a pair of second order OVSF codes which share the single first order OVSF code as a root;
    assign the obtained orthogonal OVSF codes to each frequency on a frequency domain, perform an inverse fast Fourier transform, and generate an OFDM signal;
    transmit, as a radio frequency signal, the generated OFDM signal through the transform; and
  a transmit antenna connected to the circuitry,
    wherein each of an in-phase and quadrature portion of a transmit data stream is multiplied by the assigned codes prior to performing the inverse fast Fourier transform, wherein the first order OVSF code and the pair of second order OVSF codes are multiplied with different portions of the transmitted data stream in a multiplexed manner.

9. The mobile communication device according to claim 8, wherein
  the circuitry repeats, for the entire transmission range, a process for assigning one OVSF code having a length of 2 to the power of n per signal bit to each of frequencies, the number of which is equal to 2 to the power of n (n is an integer), on a frequency axis on which an inverse fast Fourier transform is performed.

10. The mobile communication device according to claim 9, wherein
  the circuitry:
    performs, as coding in a first stage, coding with an OVSF code having a length 2 to the power of n,
    as coding in a second stage, assigns an OVSF code having a length of 2 to the power of (n+1) per signal bit to frequencies, the number of which is equal to 2 to the power of (n+1), on the frequency axis on which an inverse fast Fourier transform is performed, multiplies an amplitude thereof by a coefficient greater than 1, and
    adds signals coded in the second stage to signals coded in the first stage.

11. The mobile communication device according to claim 10, wherein the circuitry:
  further, assigns as a coding in a stage higher than the second stage, one OVSF code having a length of 2 to the power of (n+2) per signal bit to frequencies, the number of which is equal to 2 to the power of (n+1), on the frequency axis on which an inverse fast Fourier transform is performed, and an amplitude thereof is multiplied by a coefficient greater than 1, and
  adds signals coded in the respective stages.

12. The mobile communication device according to claim 11, wherein
  an OVSF code is used as an OVSF code, and an OVSF code included in a code sequence in the first stage is used for coding in a stage higher than the second stage.

13. A base station device used for a multi-user MIMO scheme comprising:
  N receive antennas that receive signals transmitted from N (N is an integer greater than or equal to 2) mobile communication devices divided into a plurality of sets, at least one of the sets including at least two mobile communication devices, wherein
  the signals received by the receive antennas include
  a signal obtained by performing an inverse fast Fourier transform on a digital signal sequence using a plurality of OVSF codes, from among a plurality of orthogonal OVSF codes that are spread to have an orthogonal relationship, assigned to mobile communication devices in each of the plurality of sets into which the N mobile communication devices are divided, wherein the plurality of OVSF codes assigned to each set of mobile communications includes at least a first order OVSF code and a pair of second order OVSF codes which share the single first order OVSF code as a root,
  wherein each of an in-phase and quadrature portion of a transmit data stream is multiplied by the assigned codes at each mobile communication device prior to each mobile communication device performing the inverse fast Fourier transform, wherein the first order OVSF code and the pair of second order OVSF codes are multiplied with different portions of the transmit data stream in a multiplexed manner.

14. The base station device according to claim 13, further comprising:
  N receiving units to which the receive antennas are individually connected, and each receiving unit:
    despreads a received signal with an OVSF code of (2 to the power of n) to separate a signal spread by an OVSF code having a length of (2 to the power of n),
    despreads the separated signal with an OVSF code of (2 to the power of (n+1)) to extract a signal spread by an OVSF code having a length of 2 to the power of (n+1), subtracts a signal obtained by multiplying the extraction result by a signal of a corresponding channel from the result obtained by separation, and
    despreads the subtraction result using the OVSF code having a length of (2 to the power of n), thereby extracting a spread signal.

15. The base station device according to claim 13, wherein
  the base station device performs reception using:
    the receive antennas, the number of which is larger than the number of mobile communication devices in the plurality of sets, and
    receiving units connected to the receive antennas,
  and the base station device combines receive signals obtained by the respective receiving units by using maximum-ratio combining.

* * * * *